March 26, 1935.  E. H. JÄHNE  1,995,455
MACHINE FOR THE MANUFACTURE OF PAPER CONTAINERS
Filed Sept. 16, 1931  2 Sheets-Sheet 1

Inventor:
E. H. Jähne

UNITED STATES PATENT OFFICE 1,995,455

MACHINE FOR THE MANUFACTURE OF PAPER CONTAINERS

Ernst Hermann Jähne, Dresden, Germany, assignor to "Universelle" Cigarettenmaschinen-Fabrik J. C. Muller & Co., Dresden, Germany Application September 16, 1931, Serial No. 563,205
In Germany September 22, 1930

18 Claims. (Cl. 93—44)

Paper containers are generally made by bringing the blank in front of a shaping channel and causing it to be pressed through the shaping channel by means of a reciprocating plunger. In this operation the ends of the blank are first of all folded U-wise and subsequently the side flaps are folded on the plunger in sequence by actuated or stationary folding members. Now experience has shown that the blanks are easily damaged while being thrust into the shaping channel as soon as the shaping plunger exceeds a certain maximum speed.

Now in order to be able to increase the speed of operation in spite of this speed limit for the plunger, acocrding to this invention, instead of one reciprocating shaping plunger it is intended that a plurality of shaping-plungers shall be used which move in a circular path through the shaping channel to the members for removing the paper container and then pass outside the shaping channel and are returned into their initial positions.

According to the present method, immediately after one shaping-plunger has entered the shaping-channel, the latter is ready to receive the next-shaping plunger. In this manner it is not only possible to save the time necessary for the backward movement of the reciprocating plunger, but in certain circumstances, the next plunger can enter the shaping channel while the preceding plunger is still in the further end of it.

An apparatus suitable for carrying out the new process can, according to the invention, be constructed in such a manner that the shaping-plungers are articulated to a chain about the pivotal axis at its rear end and the prolongations on the plungers are moved in guides in such a manner that the plungers are adjusted in the necessary manner before entering the shaping channel.

Figure 1:
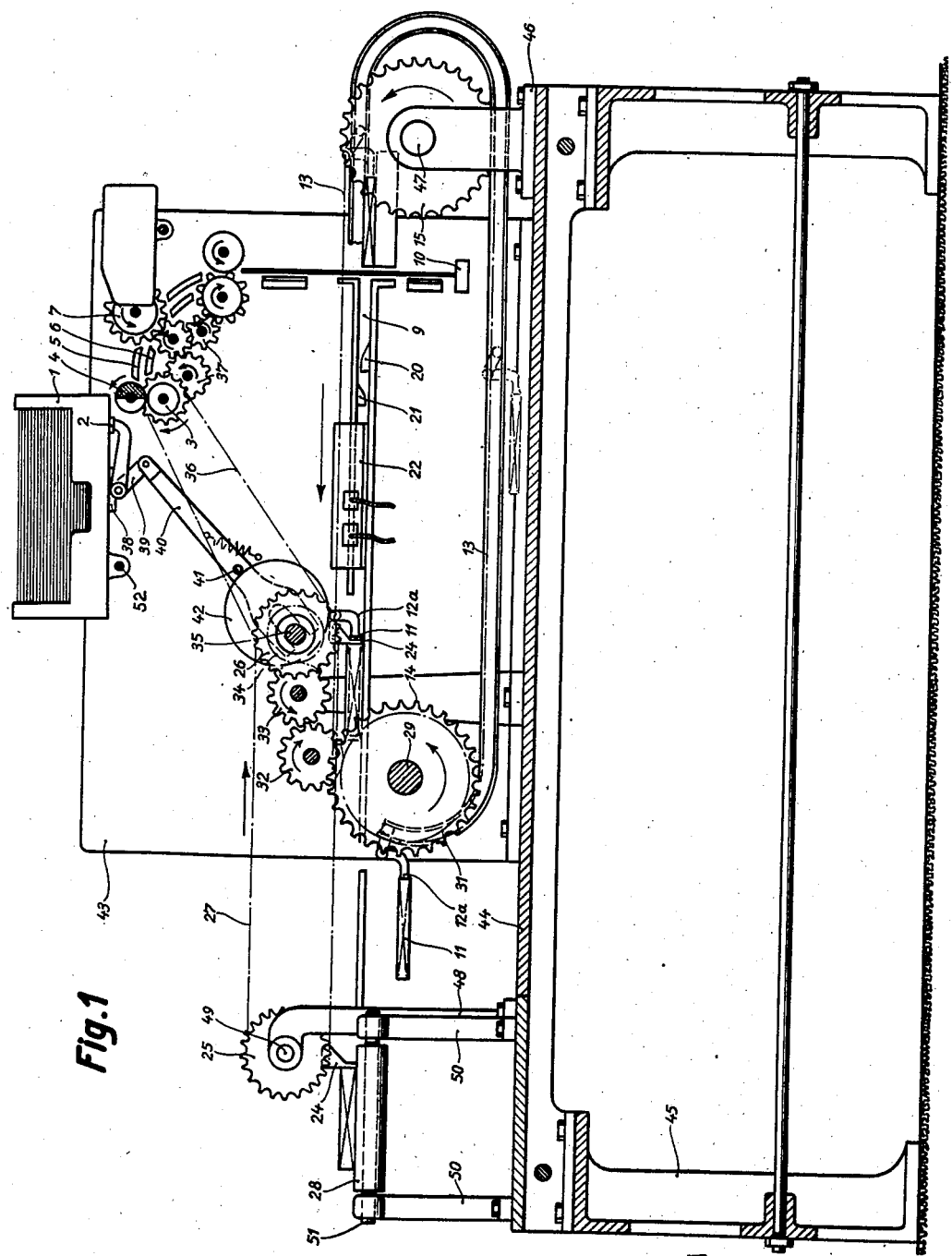
Figure 2:
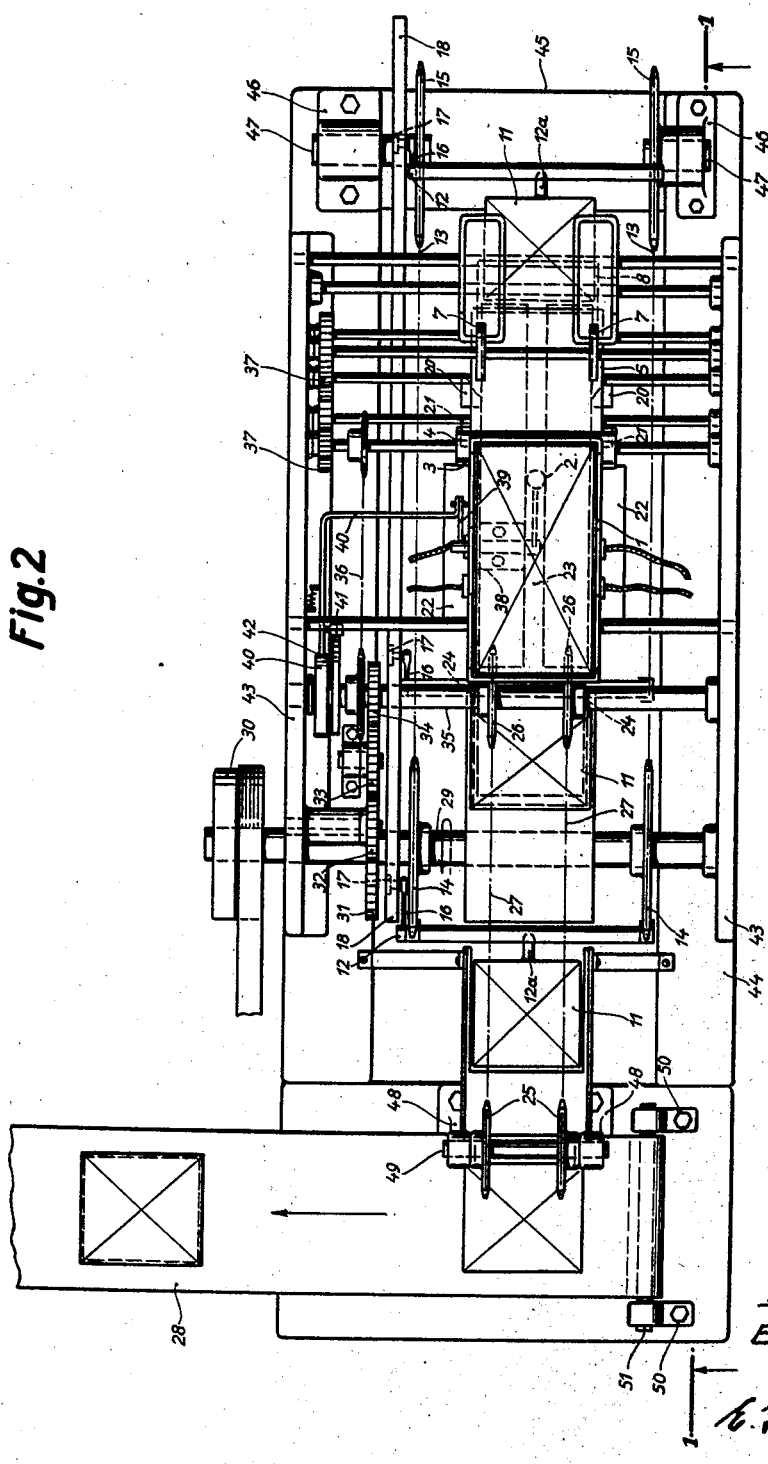

The invention will now be further explained by reference to the accompanying drawings in which, Fig. 1 is a vertical longitudinal section, and, Fig. 2 is a plan of the apparatus.

The blanks are placed in a magazine 1 from the bottom of which they are removed separately by means of a reciprocating suction head 2, and are passed between the conveyor rollers 3, 4. The upper conveyor-roller 4 has the known semi-circular form in order that it can be brought sufficiently close to the magazine without preventing the passage of the blank removed by the suction head. The blank then passes between the slide-surfaces 5, 6, then past an adhesive roller 7 and arrives at a conveyor roller 8, which thrusts the blank in front of the mouth 9 of the shaping channel until it rests on a stop 10.

The shaping plungers 11 are articulated at 12 to a conveyor chain 13 which runs over the sprocket wheels 14, 15. On the prolongations 16 of the shaping plungers there are mounted rollers 17 which are moved between the rails 18, 19 in such a manner that the shaping-plungers are accurately adjusted in relation to the mouth of the shaping channel. The shaping plungers press the blanks in known manner into the shaping channel, and the stationary folding members 20, 21 fold the transverse flaps and the longitudinal flaps successively on the shaping-plunger. On each side of the shaping channel the electrical heating members 22 are provided in order to dry the adhesive substance. One wall of the shaping channel is provided with a longitudinal slot 23 in order to allow the prolongation 12a of the shaping-plunger, which carries the pivotal axis 12, to pass through.

The shaping plungers 11 remain in the horizontal position during their travel about the endless belt. This horizontal position is maintained by the rollers 17 travelling between the rails 18 and 19 and in this manner also the shaping plungers are accurately adjusted with relation to the shaping or forming channel.

The finished containers can be removed from the plungers by means of stationary stops which, on the lower side of the revolving chain, are placed in the path of the shaping-plungers as they pass by carrying the container, and enter the longitudinally directed grooves of the shaping plunger, and remove the paper-container from the shaping plunger. Generally, however, the speed of the shaping plunger will be too great to avoid damage to the paper-container when it is removed by means of such stationary removing devices. According to this invention, therefore, the removing device 24 is carried along in the direction of the revolving shaping plunger, in such a manner that a relative velocity is produced between these two members which permits the paper container to be removed without its being damaged. The removing devices are mounted on a chain 27 running over the sprocket wheels 25, 26. They enter the longitudinal grooves of the shaping plunger and thrust the paper containers on to a conveyor belt 28, whence they pass on to the filling apparatus. The belt 27 travels at a faster speed than the endless chain carrying the plungers or formers 11. The relative speed is adjusted so that the removing device 24 will gently remove the containers from the formers 11 at the position shown in Figure 1.

The apparatus is driven by the belt pulley 30 mounted on the shaft 29. On the shaft 29 are mounted the sprocket wheels 14. By means of the cogwheels 31, 32, 33, 34 a shaft 35 is driven on which the sprocket wheel 26 of the removal chain 27 is mounted. The shaft 35, by means of the chain drive 36, also drives the delivery roller 3 which in its turn, by means of the cogwheels 37 drives the rollers 4, 7, 8. The lever 39 pivoted at 38, and which carries the suction head 2, is driven by means of a connecting rod 40, which engages the shaft 35 forkwise and carries a pin 41 provided with a roller, which is actuated by a cam 42.

The shafts 29, 35, the rollers 3, 4, 8, the adhesive roller 7 and the axles of the cogwheels 32, 33, 37 have bearings in the side-walls 43 mounted on the plate 44 of the frame 45. Upon this plate are fastened bearings 46 for the trunnions 47 of the sprocket wheels 15, bearings 48 for the axle 49 of the sprocket wheels 25, and bearings 50 for the pulley 51 which the conveyor belt 28 passes over. The magazine 1 is mounted on the top of the side-walls 43 by means of bolts 52.

Having now particularly described and ascertained the nature of my said invention and in what manner the same is to be performed, I declare that what I claim is:—

1. A carton forming machine comprising an endless chain, plungers carried by said chain, a stationary forming channel with which said plungers cooperate means for maintaining the longitudinal axes of said plungers substantially parallel to the longitudinal axis of said forming channel while passing through the same and means for maintaining said plungers in parallel relation as they move around as they are carried by said chain.

2. A carton forming machine comprising a stationary forming channel, an endless chain, plungers carried by said endless chain, means for maintaining the longitudinal axes of said plungers parallel to the axis of said forming channel and means for stripping cartons from said plungers while said plungers are traversing a rectilinear path.

3. A carton forming machine comprising a forming channel, an endless belt, spaced plungers pivotally mounted upon said belt, cam rollers carried by said plungers and a cam track for maintaining the longitudinal axes of said plungers at all times parallel to the longitudinal axis of said channel.

4. A carton forming machine comprising a forming channel, an endless belt, pivoted formers carried by said belt, means for maintaining said formers in parallel relation to the longitudinal axis of said forming channel, means for feeding blanks to a position in front of said forming channel and means for stripping cartons from said plungers while said plungers are traversing a rectilinear path.

5. A carton forming machine comprising a forming channel, an endless belt, plungers carried by said belt adapted to pass through said forming channel, means for maintaining said plungers with their longitudinal axes substantially parallel to the longitudinal axis of said forming channel while said plungers pass through said forming channel and means for stripping cartons from said plungers while said plungers are traversing a rectilinear path.

6. A carton forming machine comprising a forming channel, an endless belt, plungers carried by said belt adapted to cooperate with said forming channel, means for maintaining the axes of said plungers substantially parallel to the longitudinal axis of said forming channel, means associated with said forming channel, for folding the transverse flaps and the longitudinal flaps of a blank carried by said plunger in said forming channel and means for stripping cartons from said plungers while said plungers are traversing a rectilinear path.

7. A carton forming machine comprising an endless belt, plungers carried by said endless belt, a forming channel with which said plungers cooperate in order to form a blank into a carton, means for maintaining the longitudinal axes of said plungers substantially parallel to the longitudinal axis of said forming channel while passing through the same and mechanical means for stripping said carton from said plunger while said plunger is moving rectilinearly.

8. A carton forming machine comprising an endless belt, plungers carried by said endless belt, a forming channel with which said plungers cooperate in order to form a blank into a carton, means for maintaining the longitudinal axes of said plungers parallel, and a second endless belt carrying strippers for removing said cartons from said plungers while said plungers are moving rectilinearly.

9. A carton forming machine comprising an endless belt, plungers carried by said endless belt, a forming channel with which said plungers cooperate in order to form a blank into a carton means for maintaining the longitudinal axes of said plungers parallel, a second endless belt, strippers carried by said second endless belt and means for moving said second belt faster than said first belt so as to strip said cartons from said plungers along the rectilinear travel of said plungers.

10. A carton forming machine comprising a stationary forming channel, plungers cooperating with said channel, means maintaining said plungers with the longitudinal axes thereof substantially parallel to the axis of said forming channel, stripping means cooperating with said plungers for removing the formed cartons therefrom and means for moving said stripping means in the same direction as said plungers but at a faster speed so as to remove cartons from said plungers during the rectilinear movement of said plungers.

11. A carton forming machine comprising a forming channel, an endless belt, forming plungers carried by said belt, means for maintaining the longitudinal axes of said plungers substantially parallel to the axis of said forming channel, means for feeding a blank opposite the mouth of said forming channel and movable mechanical means for removing the cartons from said plungers during the rectilinear movement thereof.

12. A carton forming machine comprising a stationary forming channel, a series of forming plungers with their longitudinal axes substantially parallel at all times, means for passing said forming plungers consecutively through said forming channel with the longitudinal axes of said plungers substantially parallel to the longitudinal axis of said forming channel and means for stripping said cartons from said plungers during the rectilinear movement thereof.

13. A carton forming machine comprising a stationary forming channel, a pair of endless belts, spaced rods pivotally mounted upon said belts, forming plungers fixedly secured to said pivoted rods, cam rollers secured to said rods and a cam track in which said rollers travel in order to maintain the longitudinal axes of said plungers substantially parallel to the axis of said forming channel.

14. A carton forming machine comprising a stationary forming channel, a pair of endless belts, spaced rods pivotally mounted upon said belts, forming plungers fixedly secured to said pivoted rods, cam rollers secured to said rods, a cam track in which said rollers travel in order to maintain the longitudinal axes of said plungers substantially parallel to the axis of said forming channel and means traveling at a faster speed than said belt for stripping said cartons from said plungers.

15. A carton forming machine comprising a stationary forming channel, a pair of endless belts, spaced rods pivotally mounted upon said belts, forming plungers fixedly secured to said pivoted rods, cam rollers secured to said rods, a cam track in which said rollers travel in order to maintain the longitudinal axes of said plungers substantially parallel to the axis of said forming channel, a third endless belt, strippers carried by said endless belt cooperating with said plungers for removing the cartons therefrom and means for moving said third endless belt at a faster speed than said first mentioned belts.

16. A carton forming machine comprising a forming channel having a slot therein, a pair of parallel endless belts, pivoted rods secured to said belts, elbows secured to substantially the central points of said rods adapted to pass through said slot in said forming channel and plungers carried by said elbows.

17. A carton forming machine comprising a stationary horizontal forming channel, an endless belt, a series of plungers carried by said belt, means for maintaining said plungers substantially horizontal, means for feeding a blank to the mouth of said channel and means for stripping the formed cartons from said plungers during their rectilinear travel.

18. A carton forming machine comprising a stationary horizontal forming channel, an endless belt, a series of plungers carried by said belt, means for maintaining said plungers substantially horizontal, means for feeding a blank to the mouth of said channel and means moving in an endless path for stripping said cartons from said plungers during their rectilinear travel.

ERNST HERMANN JÄHNE.